United States Patent
Yoshida et al.

(10) Patent No.: US 10,994,773 B2
(45) Date of Patent: May 4, 2021

(54) STEERING SYSTEM

(71) Applicant: Toyota Jidosha Kabushiki Kaisha, Toyota (JP)

(72) Inventors: Shunsuke Yoshida, Nisshin (JP); Koichi Ito, Toyota (JP); Ruriko Sakaguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 223 days.

(21) Appl. No.: 16/219,123

(22) Filed: Dec. 13, 2018

(65) Prior Publication Data
US 2019/0185052 A1 Jun. 20, 2019

(30) Foreign Application Priority Data

Dec. 14, 2017 (JP) .............................. JP2017-239319

(51) Int. Cl.
*B62D 5/04* (2006.01)
*B62D 15/02* (2006.01)

(52) U.S. Cl.
CPC ......... *B62D 5/0496* (2013.01); *B62D 5/0448* (2013.01); *B62D 5/0463* (2013.01); *B62D 5/0481* (2013.01); *B62D 15/021* (2013.01)

(58) Field of Classification Search
CPC ...... B62D 5/04; B62D 5/0496; B62D 5/0448; B62D 5/0463; B62D 15/021; F16G 1/28
See application file for complete search history.

(56) References Cited

U.S. PATENT DOCUMENTS

| | | | | |
|---|---|---|---|---|
| 2009/0069979 A1* | 3/2009 | Yamashita | ........... | B62D 5/0463 701/42 |
| 2013/0197757 A1* | 8/2013 | Ellis | ................... | B62D 6/007 701/41 |
| 2013/0304327 A1* | 11/2013 | Morishita | ............ | B62D 5/0463 701/43 |
| 2014/0005894 A1* | 1/2014 | Aoki | ..................... | B62D 6/001 701/43 |
| 2014/0297131 A1* | 10/2014 | Kashima | ................ | B62D 5/046 701/42 |
| 2016/0159389 A1* | 6/2016 | Kuramitsu | ............. | B62D 5/049 180/446 |
| 2016/0272239 A1* | 9/2016 | Kim | .................... | B62D 15/021 |
| 2017/0327145 A1* | 11/2017 | Sakaguchi | ........... | B62D 5/0469 |

FOREIGN PATENT DOCUMENTS

| | | |
|---|---|---|
| CN | 105667572 A | 6/2016 |
| CN | 105984490 A | 10/2016 |
| JP | 2008105604 A | 5/2008 |

* cited by examiner

*Primary Examiner* — Tan Q Nguyen
(74) *Attorney, Agent, or Firm* — Dinsmore & Shohl LLP

(57) ABSTRACT

A steering system steers wheels of a vehicle through a shift of a steering shaft. The steering system includes: an electric motor; transmission device that transmits an output of the electric motor to the steering shaft; and a malfunction detector that detects a malfunction of the transmission device based on a rotational angle of the electric motor and a shift distance of the steering shaft.

15 Claims, 9 Drawing Sheets

STEERING SYSTEM

CROSS REFERENCE TO RELATED APPLICATION

The present application claims priority from Japanese Patent Application No. 2017-239319, which was filed on Dec. 14, 2017, the disclosure of which is herein incorporated by reference in its entirety.

BACKGROUND

The present disclosure relates to a steering system driving wheels of a vehicle.

Japanese Patent Application Publication No. 2008-105604 discloses a steering system provided with a power steering mechanism. The power steering mechanism includes an electric motor, a rotation transmitter that transmits the rotation of the motor to a steering nut, and a motion converter that converts the rotational motion to a linear shift of the steering shaft. The rotation transmitter includes a pair of toothed pulleys, and a toothed belt disposed over the pulleys. The steering shaft has a rack portion that engages with a pinion gear rotating in cooperation with the rotation of the steering wheel. As a result, the steering shaft moves along the axis by the steering force applied to the steering wheel and the driving force of the electric motor.

In such a steering system, the target value of an electric current to be supplied to the electric motor is determined based on the steering torque of the steering wheel, and the current to be supplied to the electric motor is feedback controlled so as to approach the target value. At the same time, the steering speed of the steering wheel and the rotational speed of the electric motor are detected. In the case where the rotational speed of the electric motor is high when compared with the steering speed of the steering wheel, such a difference is determined to be an abnormal state, such as slip of the toothed belt.

SUMMARY

Accordingly, an aspect of the disclosure relates to an improved steering system, in particular, to a technique of precisely detecting an abnormal state of the steering system.

In one aspect of the disclosure, a steering system includes a transmitter that transmits an output of an electric motor to a steering shaft and detects an abnormal state of the transmitter based on a rotational angle of the electric motor and a shift distance of the steering shaft. The abnormal state of the transmitter can be precisely detected based on upstream (input) values and downstream (output) values of the transmitter.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

A steering system configured to steer a wheel of a vehicle according to an embodiment will now be described with reference to the accompanying drawings.

First Embodiment

Figure 1:
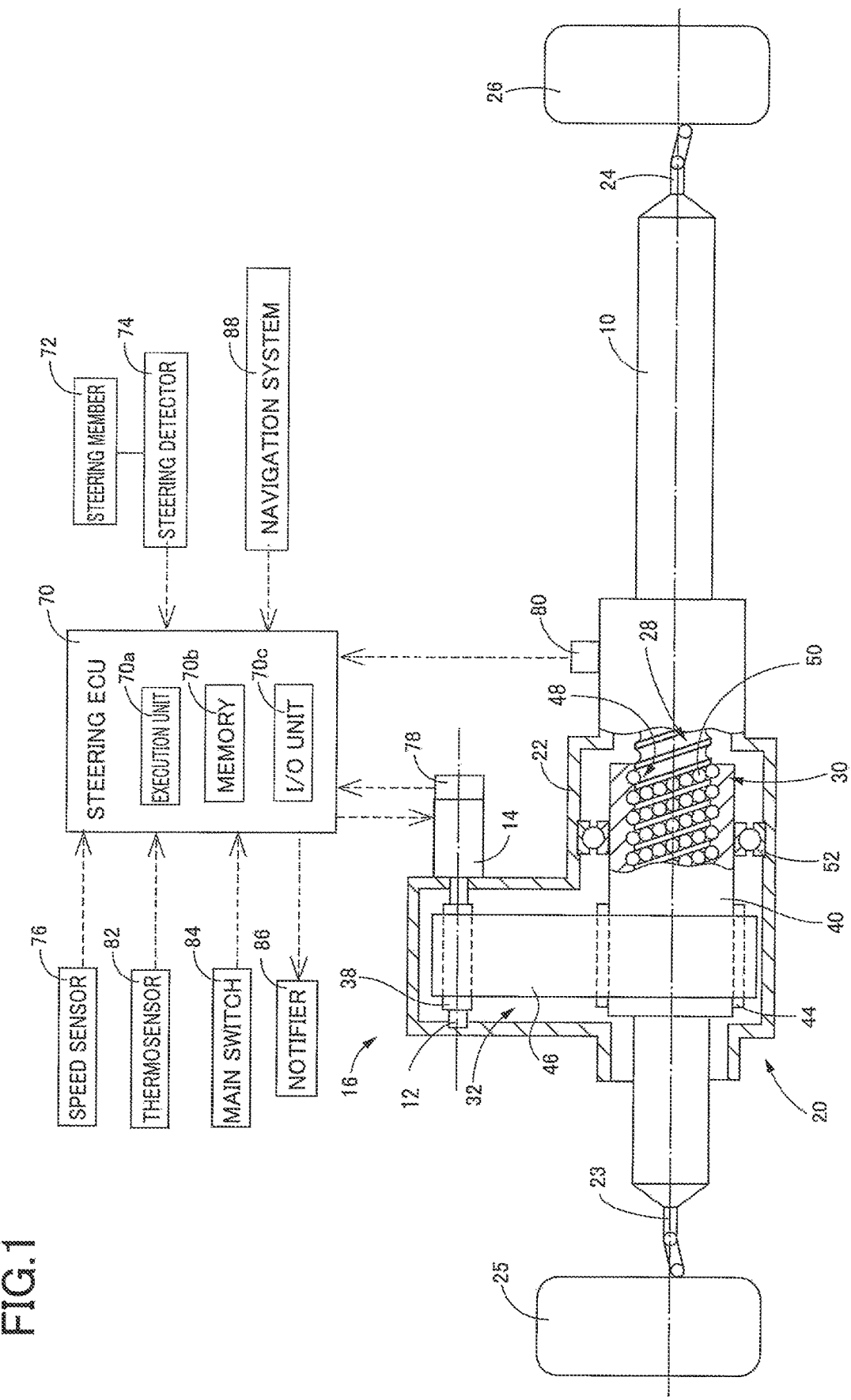
FIG. 1 is a conceptual view of a steering system according to the first embodiment.

With reference to FIG. 1, the steering system according to the first embodiment is of a so-called steer-by-wire type that includes a steering device 20 provided with a steering shaft 10 extending in the lateral direction of the vehicle, an electric motor 14 having an output shaft (rotary shaft) 12 disposed in parallel with the steering shaft 10, and a transmitter 16 configured to transmit the output of the electric motor 14 to the steering shaft 10. The steering shaft 10 is a shaft (bar) that shifts in the transverse direction of the vehicle to steer the wheels of a vehicle. The steering shaft 10 is supported by the housing 22 of the transmitter 16 therebetween so as not to rotate relative to the housing 22 but to shift relative to the housing 22 in the transverse direction (hereinafter, also referred to as "along the steering shaft 10" or merely as "along the shaft") of the vehicle. The two ends of the steering shaft 10 are connected to tie rods 23, 24, respectively, that are connected to wheels 25, 26 with knuckle arms (not illustrated). The transverse shift of the steering shaft 10 steer the wheels 25, 26. The steering shaft has a male thread portion 28 at an intermediate portion.

The transmitter 16 includes a housing 22, a motion converter 30, and a rotation transmitter 32. The rotation transmitter 32 functions as a decelerator that reduces the rotational speed of the electric motor 14 and transmits the multiplied output torque of the output shaft 12 to the steering nut 40. The rotation transmitter 32 includes a small-diameter pulley 38 rotatably fit on an output shaft 12 of the electric motor 14, a large diameter pulley 44 rotatably fit to the steering nut 40, and a belt 46 that is looped over the small-diameter pulley 38 and the large diameter pulley 44. The steering nut 40 is supported by the housing 22 with a bearing 52 therebetween so as not to shift relative to the housing 22 in the transverse direction of the vehicle but to rotate relative to the housing 22. All the small-diameter pulley 38, large-diameter pulley 44, and belt 46 are toothed. The rotation of the small-diameter pulley 38 is transmitted to the large-diameter pulley 44 through the belt 46. The ratio of the rotation rate of the large-diameter pulley 44 (steering not 40) to the rotation rate of the small-diameter pulley 38

(electric motor 14) is determined by the ratio of the number of teeth on the small-diameter pulley 38 to the number of teeth on the large-diameter pulley 44.

The motion converter 30 includes a ball screw mechanism that converts the rotational motion of the steering nut 40 to a linear motion that is then output to the steering shaft 10. The motion converter (hereinafter, also referred to as "ball screw mechanism") 30 includes a female thread portion 48 formed on the inner periphery of the steering nut 40, a male thread 28 formed on the steering shaft 10, and a large number of balls 50 disposed between these threads. The female thread portion 48 and the male thread 28 are threadably mounted with the balls 50. The rotation of the steering nut 40 causes the steering shaft 10 to linearly shift in the transverse direction of the vehicle. The relation between the rotational angle of the steering nut 40 and the shift distance of the steering shaft 10 along the shaft is determined by various parameters of the ball screw mechanism 30. Grease is used to keep the lubrication of the ball screw mechanism 30, the bearing 52 and relevant components.

Figure 5:
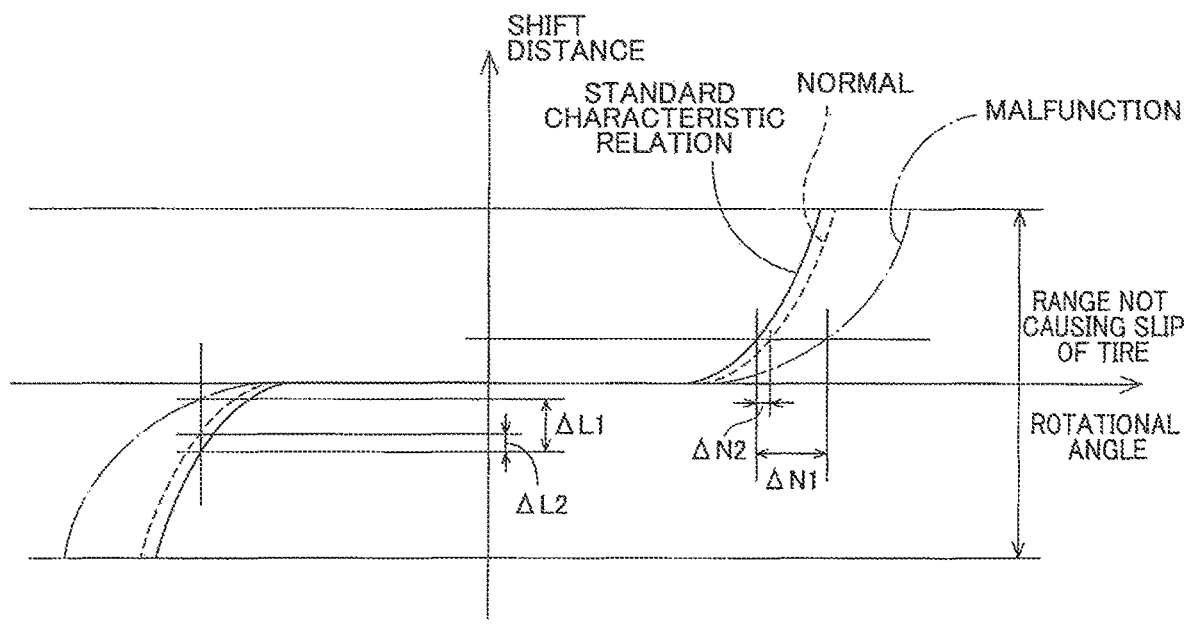
FIG. 5 illustrates standard, normal, and abnormal characteristics of the steering system.

In the case where the transmitter 16 is normal, a predetermined relation holds between the rotational angle of the electric motor 14 and the shift distance of the steering shaft 10 as indicated by a solid line in FIG. 5. Such characteristics indicated by the solid line are referred to as "standard characteristics of the transmitter 16" (also referred to merely as "standard characteristics").

The steering system is provided with a steering ECU 70 having a computer. The steering ECU 70 includes an execution unit 70*a*, a memory 70*b*, and an input/output unit 70*c*. The input/output unit 70*c* is connected to a steering state detector 74 that detects the steering state of the steering member 72 operated by a driver, a speed sensor 76 configured to detect the speed of the running vehicle; a motor tachometer 78 configured to detect the number of rotations of the electric motor 14, a position sensor 80 configured to detect the lateral position of the steering shaft 10, a thermosensor 82, a main switch 84 of the vehicle, a navigation system 88, and a notifier 86, for example.

The steering member 72 may be a steering wheel and may be a joystick or a mouse-shaped grip. The steering state detector 74 detects, for example, the steering force, steering torque, and steering amount applied to the steering member 72 and may include a steering torque sensor, a steering force sensor, and a steering amount (steering angle) sensor. The speed sensor 76 detects the speed of the miming vehicle. The motor tachometer 78 detects the number of rotations (the rotational speed) of the electric motor 14. The rotational angle of the electric motor 14 is obtained based on the rotational speed. The position sensor 80 may be of an optical type or electromagnetic type and detects the relative position of the steering shaft 10 to the housing 22. In this embodiment, the shift distance of the steering shaft 10 along the shift is obtained from a value output from the position sensor 80. The thermosensor 82 is disposed in a vehicle compartment to detect the temperature therein. Alternatively, the thermosensor 82 may be disposed near the transmitter 16. The main switch 84 is turned on when the run of the vehicle is permitted. The navigation system 88 determines whether the vehicle stops based on a stop signal or is parked in a parking space with reference to the position information of the vehicle, map information, and traffic information. The notifier 86 may be a visual notifier or an auditory notifier, for example, at least one of a display, a light source, a voice generator, or a buzzer. Alternatively, it may be a tactile notifier, for example, a vibrator for the steering member 72. The steering ECU 70 has a memory that stores the standard characteristics described above, and a malfunction detecting program, and a steering controlling program, for example.

In the steering system having such a configuration, the steering state detector 74 detects a steering amount and a steering force in response to an operation of the steering member 72. The steering ECU 70 controls the electric motor 14 to steer the wheels 25, 26 based on the detected state of steering and the speed of the running vehicle detected by the speed sensor 76.

Figure 7:
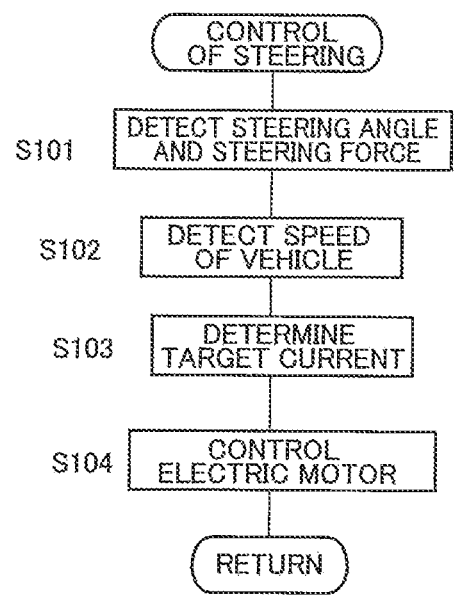
FIG. 7 is a flow chart illustrating a steering controlling program stored in the memory.

FIG. 7 is a flow chart illustrating an exemplary steering controlling program. In Step S101 (hereinafter "Step" is omitted where appropriate) the steering amount and the steering force are detected. In S102, the speed sensor 76 detects the speed of the vehicle. In S103, a target current value to be supplied to the electric motor 14 is obtained based on the speed of the vehicle, the steering amount, and the steering force. In S104, the electric motor 14 is controlled. The electric motor 14 rotates, and the rotation of the electric motor 14 is transmitted through the rotation transmitter 32 to the steering nut 40. The ball screw mechanism 30 converts the rotary motion of the steering nut 40 to a linear shift that is then transmitted to the steering shaft 10. The steering shaft 10 shifts in the transverse direction of the vehicle to steer the wheels 25, 26 of the vehicle. A predetermined relation is settled between the rotational angle of the electric motor 14 and the shift distance of the steering shaft 10 as described above. In the case where the rotational angle of the electric motor 14 is determined, the shift distance of the steering shaft 10 and then the steering angle of the wheels 25, 26 are determined.

In the case where large slack or play (hereinafter, such malfunction may be referred to as "malfunction of the transmitter 16") occurs in the rotation transmitter 32, the ball screw mechanism 30, or the bearing 52 due to the expansion of the belt 46 or abrasion of teeth of the belt 46, small-diameter pulley 38, or large-diameter pulley 44 or bearing components, such as an inner lace, an outer lace, or balls, the actual characteristic curve of the rotational angle of the electric motor 14 and the shift distance of the steering shaft 10 significantly deviates from the standard characteristic curve (solid line) in FIG. 5. In this state, the steering angle of the wheels 25, 26 cannot be accurately controlled through the control of the electric motor 14. In the case where the steering member 72 is mechanically connected to the steering shaft 10, the driver often finds that the steering angle of the wheels 25, 26 are small compared to the steering amount of the steering member 72. The driver can also steer the steering member 72 to adjust the wheels 25, 26 to a desired angle. In contrast, the steering system of steer-by-wire type makes the awareness difficult for the driver and thus precludes the adjustment of the steering angle of the wheels 25, 26 to a desired angle by the driver.

In this embodiment, the transmitter 16 is determined to be abnormal in the case where the shift distance of the steering shaft 10 when the rotational angle from a neutral position of the electric motor 14 reaches a first set rotational angle is smaller by a first malfunction determining threshold than the standard shift distance of the steering shaft 10 when the rotational angle from the neutral position of the electric motor reaches the first set rotational angle. In the case where the steering shaft 10 is shifted rightward in response to the positive rotation of the electric motor 14 and leftward in response to the negative rotation of the electric motor 14, when the rightward shift distance from the neutral position of the steering shaft 10 in response to the positive rotation by a predetermined angle from the reference position of the electric motor 14 is the same as the leftward shift distance from the neutral position of the steering shaft 10 in response to the negative rotation by the predetermined angle from the reference position of the electric motor 14, the reference position corresponds to the neutral position. Hereinafter, the rotational angle from the neutral position of the electric motor 14 may be referred to simply as "rotational angle". The position of the steering shaft 10 in the case of the electric motor 14 residing at the reference position may be referred to as "neutral position of the steering shaft 10".

In the case where the malfunction detecting condition is satisfied. In this embodiment, the malfunction of the transmitter 16 is detected. The malfunction detecting condition may be satisfied in the case where the main switch 84 is turned on and the steering member 72 is not operated in a parked vehicle (not in a running vehicle) for the reason other than a stop signal. The navigation system 88 can determine the state of the parked vehicle for the reason other than the stop signal. In the case where the malfunction detecting condition is satisfied, the electric motor 14 is driven to shift the steering shaft 10. In summary, the electric motor 14 is driven only for the purpose of malfunction detection.

Figure 2:
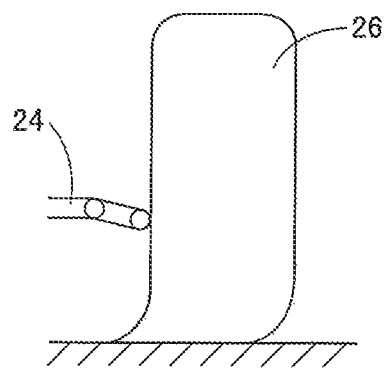
FIG. 2 is a front view of a wheel driven by the steering system.

With reference to FIGS. 2 and 5, the rotational angle of the electric motor 14 is set within a range not causing slip of the tires of the wheels 25, 26, in other words, within a range keeping the contact of the tires of the wheels 25, 26 to the road. In detail, the rotation of the electric motor 14 causes the steering shaft 10 to shift and thus the wheels 25, 26 to be subjected to elastic deformation. In the case where the shift distance of the steering shaft 10 due to a large rotational angle of the electric motor 14 exceeds a range that can be absorbed by the elastic deformation of the wheels 25, 26, the tires slip to be steered. In this embodiment, the malfunction of the transmitter 16 is detected within a range that can absorb the rotational angle of the electric motor 14 or the shift distance of the steering shaft 10 by elastic deformation of the wheels 25, 26. For example, the set rotational angle may correspond to the rotational angle of the electric motor 14 in the case of approximately one turn of the electric motor 14.

A set of the rotational angle of the electric motor 14 and shift distance of the steering shaft 10 is detected in combination, in response to the rightward or leftward shift of the steering shaft 10. In this embodiment, the shift distance of the steering shaft 10 and the rotational angle of the electric motor 14 each have a reverse sign (plus or minus) in the case of the rightward or leftward shift of the steering shaft 10. In this structure of the steering device 20, the absolute rotational angel of the motor 14 is the same between the rightward shift and the leftward shift of the steering shaft 10 in the case where the absolute shift distance of the steering shaft 10 is the same between the rightward shift, and the leftward-shift of the steering shaft 10. The rotation transmitter 32 and the motion converting mechanism 30 inevitably have slack or play even in a normal transmitter 16. At the start of the rotation of the electric motor 14, a relative position between the teeth of each of the small diameter pulley 38 and the large diameter pulley 44 and the teeth of the belt 46, the relative position between the male thread 28 and the female thread portion 48, and the relative position between the inner lace and the outer lace of the bearing 52 are uncertain, but one of these components may be shifted toward the other component (in the case where one of these is shifted toward the other, such shift is referred to as "shift of the component". The small diameter pulley 38, the large diameter pulley 44, the belt 46, the male thread 28, the female thread portion 48, and the inner lace and the outer lace of the bearing 52 may be referred to as "component").

The absolute rotational angel of the motor 14 may differ between the rightward shift and the leftward shift of the steering shaft 10 even in the case where the absolute shift distance of the steering shaft 10 is the same between the rightward shift and the leftward shift of the steering shaft 10.

The set of the rotational angle of the electric motor 14 and the shift distance of the steering shaft 10 is obtained in both the rightward shift and the leftward shift of the steering shaft 10 and a true neutral position is obtained by this set. The rotational angle obtained based on the detected value of the motor tachometer 78 is corrected with the true neutral position.

Figure 4:
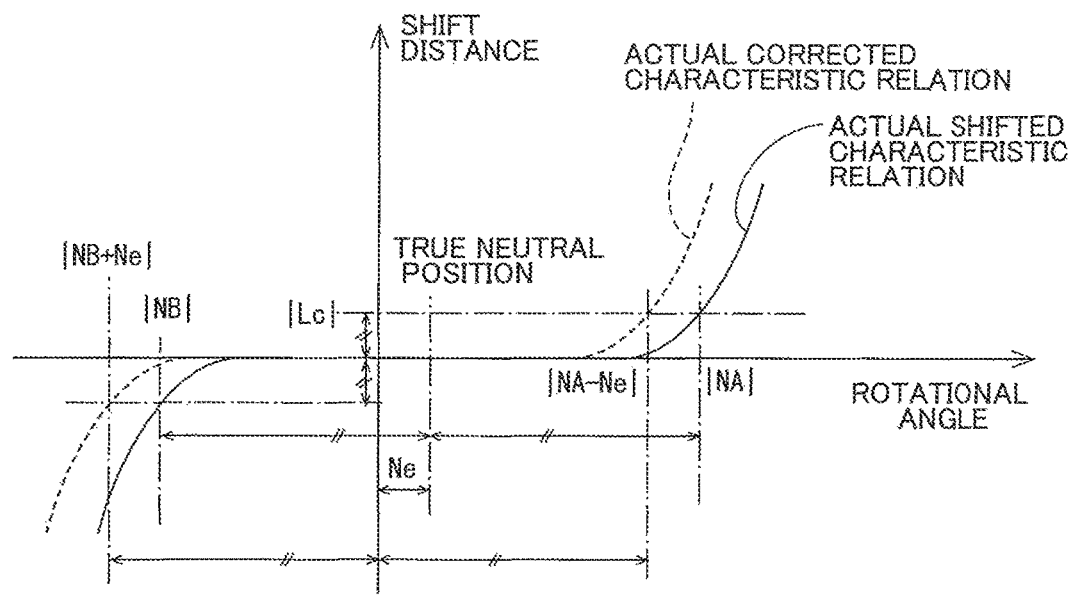
FIG. 4 illustrates a process of correcting a rotational angle of an electric motor in the steering system.

For example, in the actual characteristic curve indicated by the solid line in FIG. 4, the absolute rotational angel of the motor 14 is differ (|NA|≠|NB|) between the rightward shift and the leftward shift of the steering shaft 10 even in the case where the absolute shift distance of the steering shaft 10 is the same (for example, |Lc|) between the rightward shift and the leftward shift of the steering shaft 10. In the case where the absolute rotational angles in the rightward shift and the leftward shift are the same, the reference position of the electric motor 14 is a true neutral position that is shifted by a rotational angle Ne in FIG. 4. The actual characteristic curve indicated by the solid line is corrected as indicated by a broken line. In detail, in the case where the steering shaft 10 shifts rightward by a shift distance Lc, the rotational angle NA of the electric motor 14 is corrected to the rotational angle (NA−Ne). In the case where the steering shaft 10 shifts leftward, the rotational angle NB of the electric motor 14 is corrected to the rotational angle (NB+Ne). Such correction is referred to as "correction of the rotational angle based on the correction of the neutral position" or simply as "rotational angle correction". In FIG. 4, the difference Ne in the neutral position due to shift of the component is enlarged in the name of better understanding although the actual difference is smaller than that. As indicated in the solid line in FIG. 5, the motion converting mechanism 30 and the rotation transmitter 32 inevitably have slack or play; hence, the steering shaft 10 has a dead range that does not follow the rotation of the electric motor 14. In the case where the steering shaft 10 has a small dead range not following the rotation of the electric motor 14, the transmitter 16 is determined to be a normal state. In the case where the steering shaft 10 has a large dead range not following the rotation of the electric motor 14, the transmitter 16 is determined to be an abnormal state.

Figure 3:
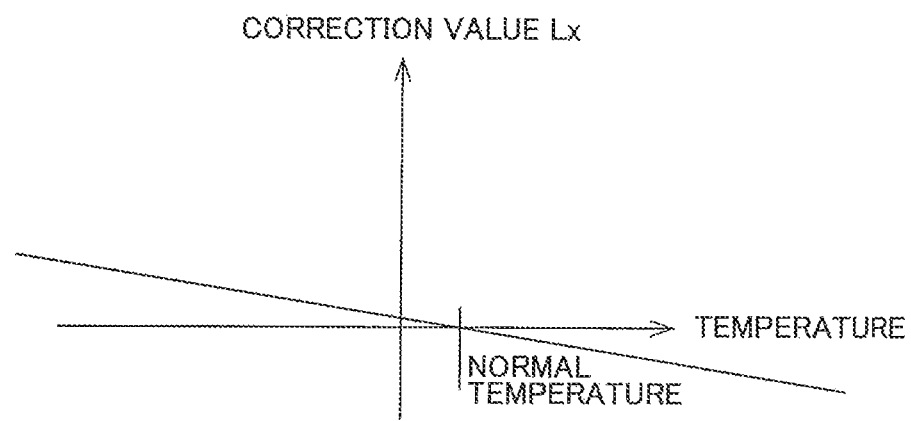
FIG. 3 illustrates a relation between a correction value and a temperature stored in a memory in a steering ECU of the steering system.

The shift distance is corrected based on the temperature detected by the thermosensor 82. The amount of the slack or play in the motion, converting mechanism 30 and the rotation transmitter 32, i.e., slack or play between the teeth, of each of the small-diameter pulley 38 and large-diameter pulley 44 and the teeth of the belt 46, slack or play between the male thread 28 and the female thread portion 48, and slack or play between the inner lace, outer lace, and balls of the bearing 52 varies by expansion or shrinkage of the components due to a variation in temperature. The amount of the slack or play is large in the case where the temperature is low than in the case where the temperature is high. In the case where the rotational angle of the electric motor 14 is the same, the shift distance of the steering shaft 10 is short in the case where the amount of the slack or play is large than in the case where the amount of the slack or play is small. This is because the rotational angle of the electric motor 14 not causing the shift of the steering shaft 10 is larger in the case where the amount of the slack or play is large than in the case where the amount of the slack or play is small. In this embodiment, the absolute value (L+Lx) of the corrected shift distance is obtained by the sum of the absolute value of the shift distance L determined based on a position detected by the position sensor 80 and the correction value Lx of the shift distance. The correction value Lx is larger in the case where the temperature is low than in the case where the temperature is high. For example, the correction value Lx may be defined as zero at a normal temperature (e.g., a standard temperature, for example, 25° C.). With reference to FIG. 3, the relation between the temperature and the correction value is preliminarily stored in this embodiment. The correction value is obtained from the temperature detected by the thermosensor 82 and the relation depicted in FIG. 3 and is added to the shift distance obtained from the result detected by the position sensor 80. Such correction is referred to as "shift distance correction based on the temperature" or merely as "shift distance correction".

Figure 6:
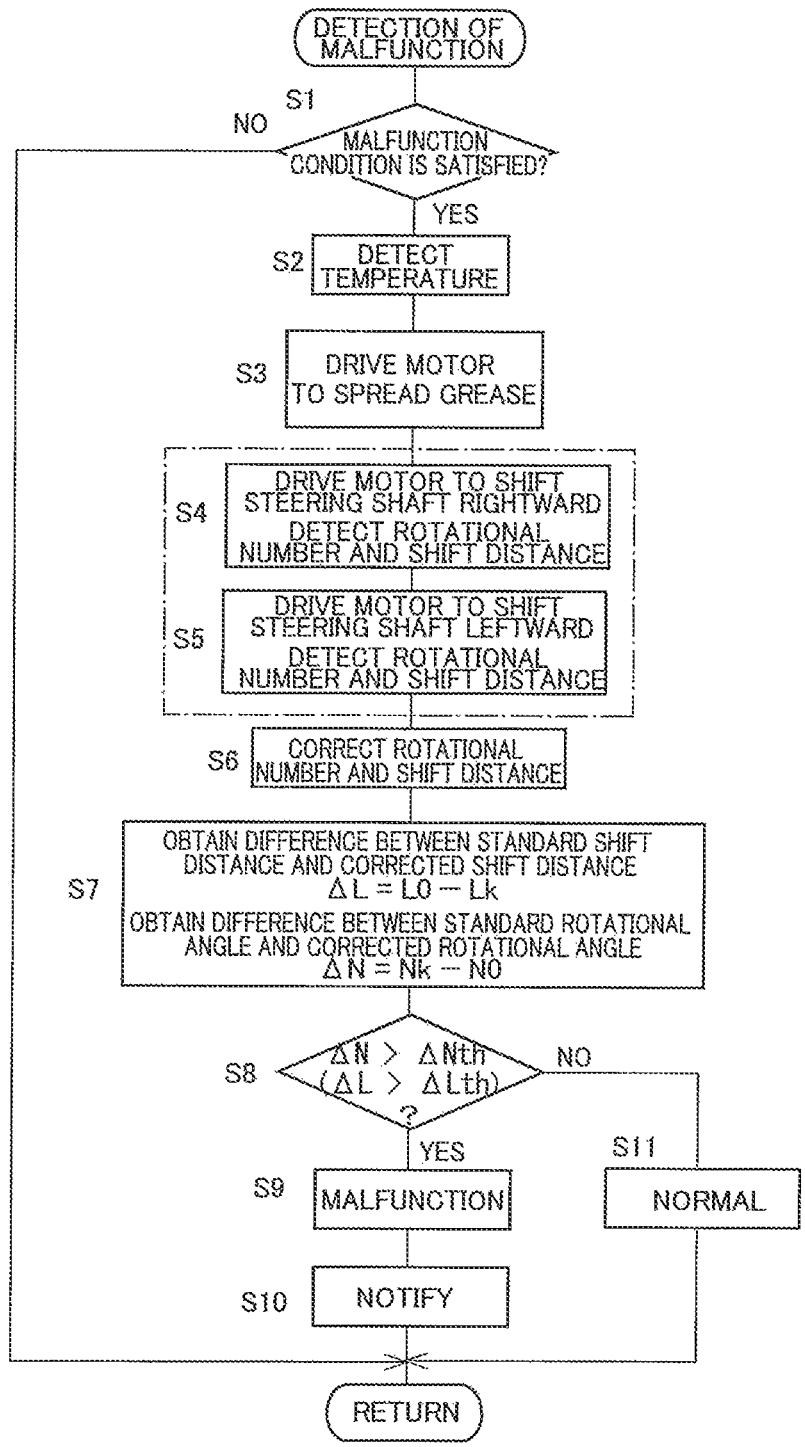
FIG. 6 is a flow chart illustrating a malfunction detecting program stored in the memory.

The detection of the malfunction of the transmitter 16 is executed by the malfunction detecting program represented in the flow chart of FIG. 6. In S1, whether the malfunction detecting condition is satisfied is determined. In the case where the malfunction detecting condition is not satisfied, then, steps after S2 are not performed; otherwise, the thermosensor detects the temperature in S2. In S3, the electric motor 14 is driven to soften the grease. While the vehicle stops after a significantly small shift distance of the steering shaft 10 continues for a long time, for example, after the vehicle runs in a straight line and stops, grease may get hardened even at a normal temperature. The hardening of the grease precludes the shift of the steering shaft 10, and thus precludes the exact detection of the shift distance. The electric motor 14 is driven to shift the steering shaft 10 and thus the grease is softened. The soften grease spreads over the entire components.

In S4, the electric motor 14 is driven from the neutral position to shift the steering shaft 10 to the right. In this case, one or more suits of rotational angles of the electric motor 14 and shift distances of the steering shaft 10 are obtained based on the results detected by the motor tachometer 78, and the position sensor 80. In S5, the electric motor 14 is driven to shift the steering shaft 10 to the left and one or more sets of rotational angles of the electric motor 14 and shift distances of the steering shaft 10 are obtained based on the results of detected by the motor tachometer 78 and the position sensor 80.

In S6, the rotational angle and the shift distance are corrected as described above. The rotational angle is corrected from the true neutral position while the shift angle is corrected from the temperature. In S7, the remainder $\Delta L$ (=L0−Lk) is obtained by subtracting the corrected shift distance Lk at the first set rotational angle after correction, from a standard shift distance L0 that is a shift distance in the case where the rotational angle of the electric motor 14 when the transmitter 16 is normal is the first set rotational angle. In S8, whether the difference is greater than the first malfunction determining threshold $\Delta Lth$ is determined. With reference to FIG. 5, in the case where the difference $\Delta L1$ is greater than the first malfunction determining threshold $\Delta Lth$ as indicated by a dot-and-dash line, the transmitter 16 is determined to be abnormal (YES) in S9, and the notifier 86 is turned on in S10. In the case where the difference $\Delta L2$ is less than the first malfunction determining threshold $\Delta Lth$, the transmitter 16 is determined to be normal in S11 as indicated by a broken line in FIG. 5.

In S7 and S8, a standard rotational angle N0 of the electric motor 14 at a first set shift distance of the steering shaft 10 in the case where the transmitter 16 is normal is subtracted from the corrected rotational angle Nk of the electric motor at the first set shift distance of the steering shaft 10 after correction to determine the difference (Nk−N0). Whether the difference is greater than a second malfunction determining threshold $\Delta Nth$ is determined. In the case where the difference (Nk−N0) is less than the second malfunction determining threshold $\Delta Nth$ ($\Delta Nth \geq \Delta N2$) as indicated by a broken line in FIG. 5, the transmitter 16 is determined to be normal. In the case where the difference (Nk−N0) is greater than the second malfunction determining threshold $\Delta Nth$ ($\Delta N1 > \Delta Nth$), the transmitter 16 is determined to be abnormal.

In this embodiment, the malfunction of the transmitter 16 is detected and the notifier 86 is activated. Since the maintenance of the transmitter 16 can be carried out at appropriate timing, the transmitter 16 can be properly prevented from becoming inoperable.

The malfunction of the transmitter 16 can be precisely detected based on the detected value by the motor tachometer 78 upstream of the transmitter 16 and the detected value by the position sensor 80 downstream of the transmitter 16.

Since the shift distance is corrected based on the temperature, the detection of the malfunction caused by a variation in amount of slack or play due to a change of the temperature from normal temperature can be properly prevented.

Since the rotational angle is corrected based on the neutral position, the detection of the malfunction caused by shift of the component can be avoided. As a result, the slack or play at the transmitter 16 can be precisely obtain.

Since the malfunction of the transmitter 16 is detected within a range not causing slip of tires on the wheels 25, 26, the detection of the malfunction of the transmitter 16 is not affected by the coefficient of friction of the tires with the road surface. In addition, the malfunction of the transmitter 16 can be detected even in the case where any object exists near the wheels 25, 26.

In the steering system of a steer-by-wire type in this embodiment, the shift of the steering shaft 10 is not transferred to the steering member 72 during the detection of the malfunction, and the malfunction is detected within a range not causing the slip of the tires on the wheels 25, 26, Thus, a driver experiences less uncomfortable feeling when the malfunction of the transmitter 16 is detected.

In the steering system disclosed in Japanese Patent Application Publication No. 2008-105604, the steering wheel is operated by a driver and the current to be supplied to the electric motor is controlled in a feedback manner based on the steering state by the driver. In such a case, the malfunction of the rotation transmitter is detected based on the steering speed of the steering wheel and the rotational angle of the electric motor. In contrast, in the steering system according to this embodiment, the electric motor 14 is driven for only the detection of malfunction while the driver is not operating the steering member 72. As a result, the malfunction of the transmitter 16 can be correctly detected.

The process in S3 may be omitted. In the case where the vehicle is stopped after the steering for parking, the drive of the electric motor 14 for spreading of the grease may be omitted. For example, the malfunction detecting condition may be satisfied in the case where the following two conditions are satisfied: (a) The vehicle is stopped after a steering for parking (for example, in the case where an amount of steering of the steering member 72 is more than a predetermined amount and steering direction of the steering member 72 is changed several times); and (b) The time is before the predetermined time elapses after the stop. In some embodiments, the correction of the shift distance using the temperature and the correction of the rotational angle based on the neutral position may be omitted.

The shift distance may be corrected based on the temperature of the grease because the viscosity of the grease has high viscosity at low temperature and the steering shaft 10 is difficult to shift.

The temperature and the correction value may have a relation other than that illustrated in FIG. 3. For example, the correction value may vary stepwise as the temperature varies. The correction value may be zero when the expansion or shrinkage rate is less than a predetermined rate; may be a value less than zero when the expansion rate is greater than a predetermined expansion rate (a value decreasing with temperature rise or a constant value less than zero); or may be a value greater than zero when the shrinkage rate is greater than the predetermined shrinkage rate (a value increasing with temperature drop or a constant value greater than zero).

As described above, the memory 70b of the steering ECU 70 corresponds to a standard characteristic memory. A malfunction detector is constituted by the standard characteristic memory, the speed sensor 76, the thermosensor 82, the motor tachometer 78, the position sensor 80, the main switch 84, the navigation system 88, portions of the steering ECU 70 which store and execute the malfunction detecting program, for example. Each of a rotational angle corrector and a shift distance corrector is constituted by portions of the malfunction detector which store and execute S6, for example. A rotational angle obtainer is constituted by the motor tachometer 78 and portions of the malfunction detector which obtain the rotational angle based on a value detected by the motor tachometer 78, for example. A shift distance obtainer is constituted by the position sensor 80 and portions of the malfunction detector which obtain the shift distance based on the position sensor 80, for example. A motor driving unit that drives the motor to spread the grease is constituted by portions of the malfunction detector which store and execute S3. A steering controller is constituted by portions of the malfunction detector which store and execute a steering controlling program in the steering ECU 70, for example. The first set shift distance may be a level that can exactly detect a difference in rotational angle of the electric motor 14 between a transmission device (i.e. transmitter) 16 that is normal and a transmission device (i.e. transmitter) 16 that is abnormal. A first set rotational angle may also be a level that can exactly detect a difference in shift distance of the steering shaft 10 between a transmission device 16 that is normal and a transmission device 16 that is abnormal.

In some embodiments, the standard characteristics stored in the standard characteristic memory have a relation between the rotational angle of the electric motor 14 and the shift distance of the steering shaft 10 in the case where the neutral position of the electric motor 14 is a true neutral position, the temperature is normal temperature, and the transmission device 16 that is normal.

Second Embodiment

Figure 8:
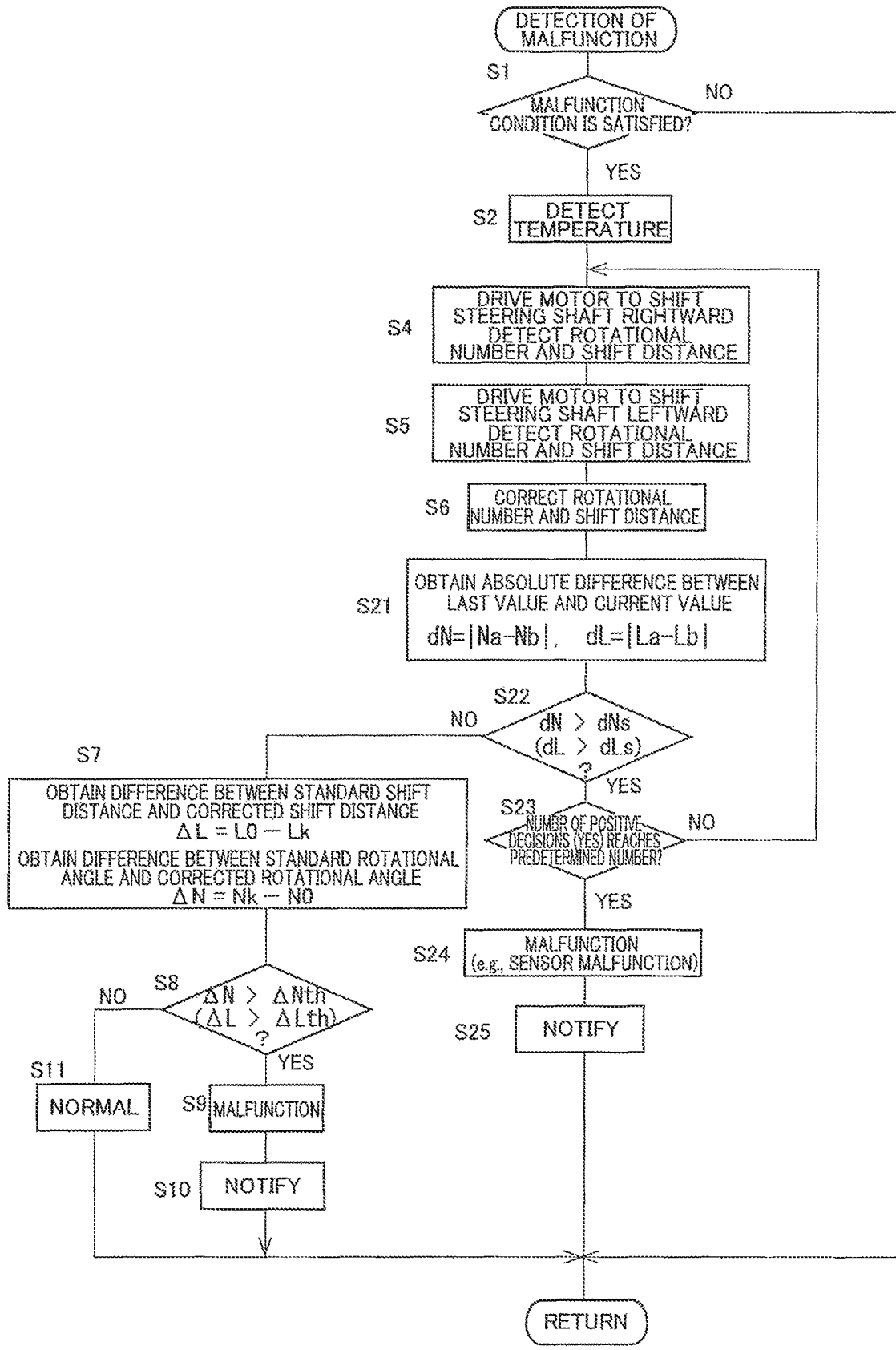
FIG. 8 is a flow chart illustrating a malfunction detecting program stored in the memory of the steering system according to the second embodiment.

In the first embodiment, the malfunction is detected after the electric motor 14 is driven to spread the grease. Alternatively, the malfunction may be detected while the electric motor 14 is being driven without spreading of the grease. FIG. 8 is a flow chart illustrating an example of such detection. The same step number is assigned to the same execution procedure as illustrated in the flow chart of FIG. 6 without redundant explanation. After the rotational angle obtained based on the value detected by the motor tachometer 78 and the shift distance obtained based on the value detected by the position sensor 80 are corrected, an absolute difference dL (=|La−Lb|) between the last shift distance La and the current shift distance Lb after the correction of the steering shaft 10 in the case where the corrected rotational angle of the electric motor 14 is a second set rotational angle in S12; and then the absolute difference dL is compared with a first variance determining threshold dLs in S22. In the case where dL is greater than dLs (YES), then whether the number of the positive decisions (YES) reaches a predetermined number is determined in S23: otherwise (NO) the electric motor 14 is re-driven in S4 to S6 to determine a set of rotational angle of the electric motor 14 and shift distance of the steering shaft 10 in each of the rightward and leftward shifts of the steering shaft 10. In S21 to S23, the absolute difference between the last shift distance La and the current shift distance Lb is obtained; in the case where the absolute difference is greater than the first variance determining threshold dLs; then whether the number of the positive decisions (YES) reaches a predetermined number is determined.

In the case where the detection of the malfunction starts with an un-spread state of the grease, the shift distance of the steering shaft 10 varies with spread of the grease. Thus, the difference between the last shift distance La and the current shift distance Lb increases and becomes greater than the first variance determining threshold dL. After the spread of the grease, the difference between the last shift distance La and the current shift distance Lb also decreases in usual cases. The grease usually spreads before the number of drive operations of the electric motor 14 reaches a predetermined number. Thus, before the number of the drive operations of the electric motor 14 reaches the predetermined number, the absolute difference between the last shift distance La and the current shift distance Lb becomes less than the first variance determining threshold dL, and the determination in S22 is negative (NO). Thus, the same procedures as those in the first embodiment are carried out in S7 to S11. Since the last shift distance is 0 in the first cycle, the absolute difference between the last shift distance La and the current shift distance Lb is greater than the first variance determining threshold dLs (YES in S22).

In the case where the difference between the last shift distance La and the current shift distance Lb does not decrease after S4 to S6 are repeated by predetermined cycles, the position sensor 80 and/or the motor tachometer 78 is estimated of malfunction. In the case where the result is YES in S23, the malfunction of the position sensor 80 and/or the motor tachometer 78 is determined in S24, and a notification is made in S25. In such a case, any other malfunction may occur in the steering system, as well as those in the position sensor 80 and/or the motor tachometer 78; hence, the malfunction can be regarded as the malfunction of the steering system including malfunction of the transmission device 16, the position sensor 80, and the motor tachometer 78 in S24.

This embodiment accordingly has an advantage in that the malfunction of the steering system including the transmission device 16, position sensor 80, and motor tachometer 78 can be detected at the same time.

In this embodiment, an obtainer-malfunction detector is constituted by portions of the steering ECU 70 which store and execute S21 to S25, for example, and a motor redriving unit is constituted by portions of the steering ECU 70 which store and execute S4 to S6 until a positive decision (YES) in S23, for example.

The process in S21 and S22 may obtain the absolute difference dN between the last value Na and the current value Nb on the rotational angle of the electric motor 14 in the case where the shift distance of the steering shaft 10 is a second set shift distance, and compare the absolute difference with a second variance threshold dNs.

The second set shift distance and the second set rotational angle may be the same as or different from the first set shift distance and the first set rotational angle, respectively. In the case of the same shift distance and the same rotational angle, the calculation can be simplified.

Third Embodiment

Figure 9:
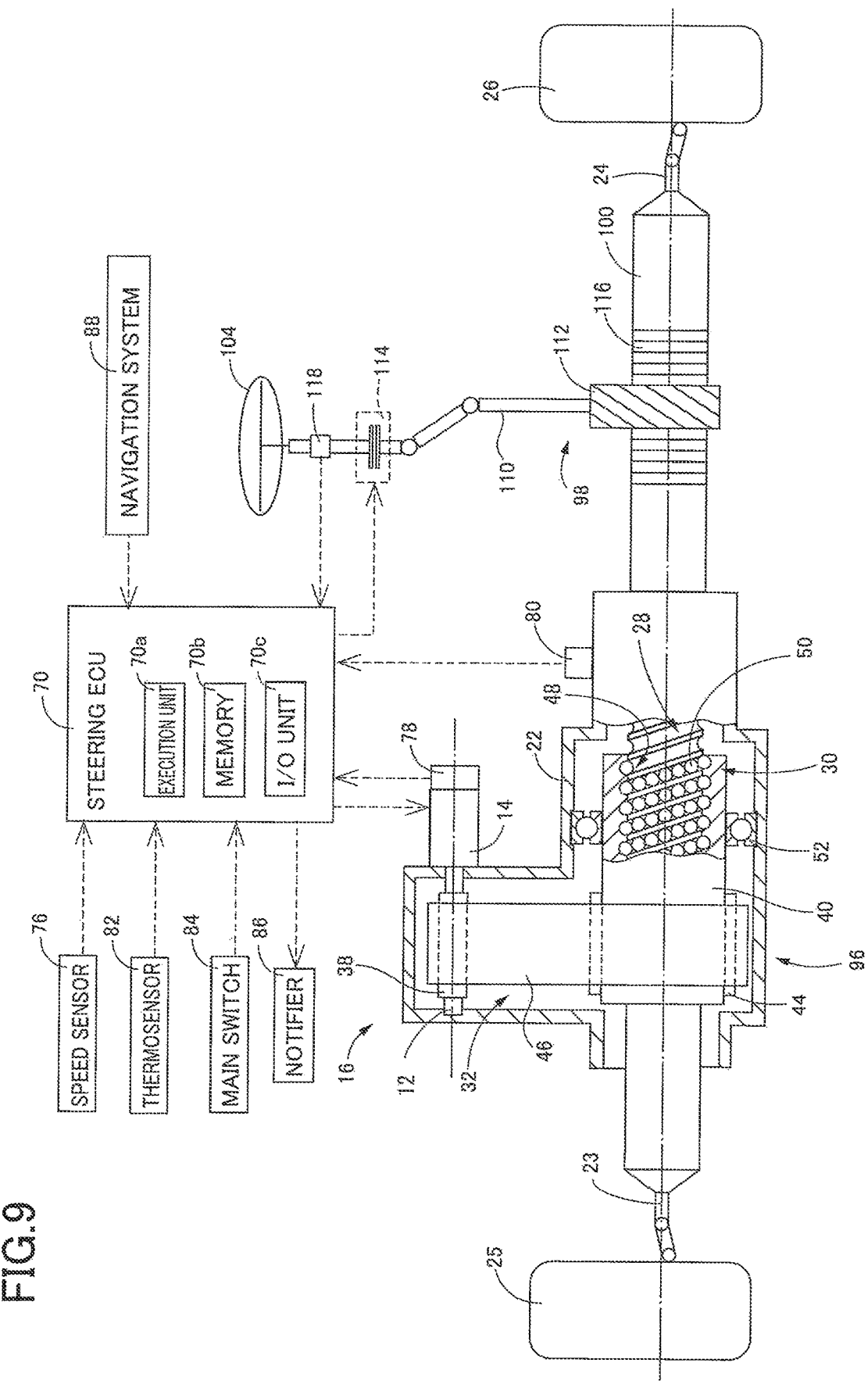
FIG. 9 is a conceptual view of a steering system according to the third embodiment.

The present disclosure is also applicable to a steering system provided with a power steering mechanism as illustrated in FIG. 9. In this embodiment, the steering system includes a power steering mechanism 96, a steering transmission device 98, and a steering shaft 100. The power steering mechanism 96 includes an electric motor 14 and a transmission device 16, as in the first and second embodiments. The steering transmission device 98 transmits the rotation of the steering wheel 104 to the steering shaft 100. The steering transmission device 98 includes a shaft 110 coupled to the steering wheel 104, a pinion 112 rotatably integrated to the shaft 110, an electromagnetic clutch 114 disposed between the steering wheel 104 and the pinion 112, and rack 116 engaging with the steering shaft 100. In response to turn of the steering wheel 104, the pinion 112 also turns and the steering shaft 100 shifts. The steering state detector 118 detects the steering state of the steering wheel 104, i.e., the steering angle of the steering wheel 104 and the steering torque applied to the steering wheel 104.

The electromagnetic clutch 114 performs coupling or decoupling of the steering wheel 104 and the pinion 112, transmits the steering force of the steeling wheel 104 to the pinion. 112 in the coupling mode, and decouples the steering wheel 104 from the pinion 112 in the decoupled state.

The electric motor 14 is controlled to assist the steering operation of the steering wheel 104 in the coupling mode of the electromagnetic clutch 114. The steering system functions as a steer-by-wire mode in the decoupled state of the electromagnetic clutch 114. The electric motor 14 is controlled such that the wheels 25, 26 of the vehicle are steered in response to the steering state of the steering wheel 104.

Figure 10:
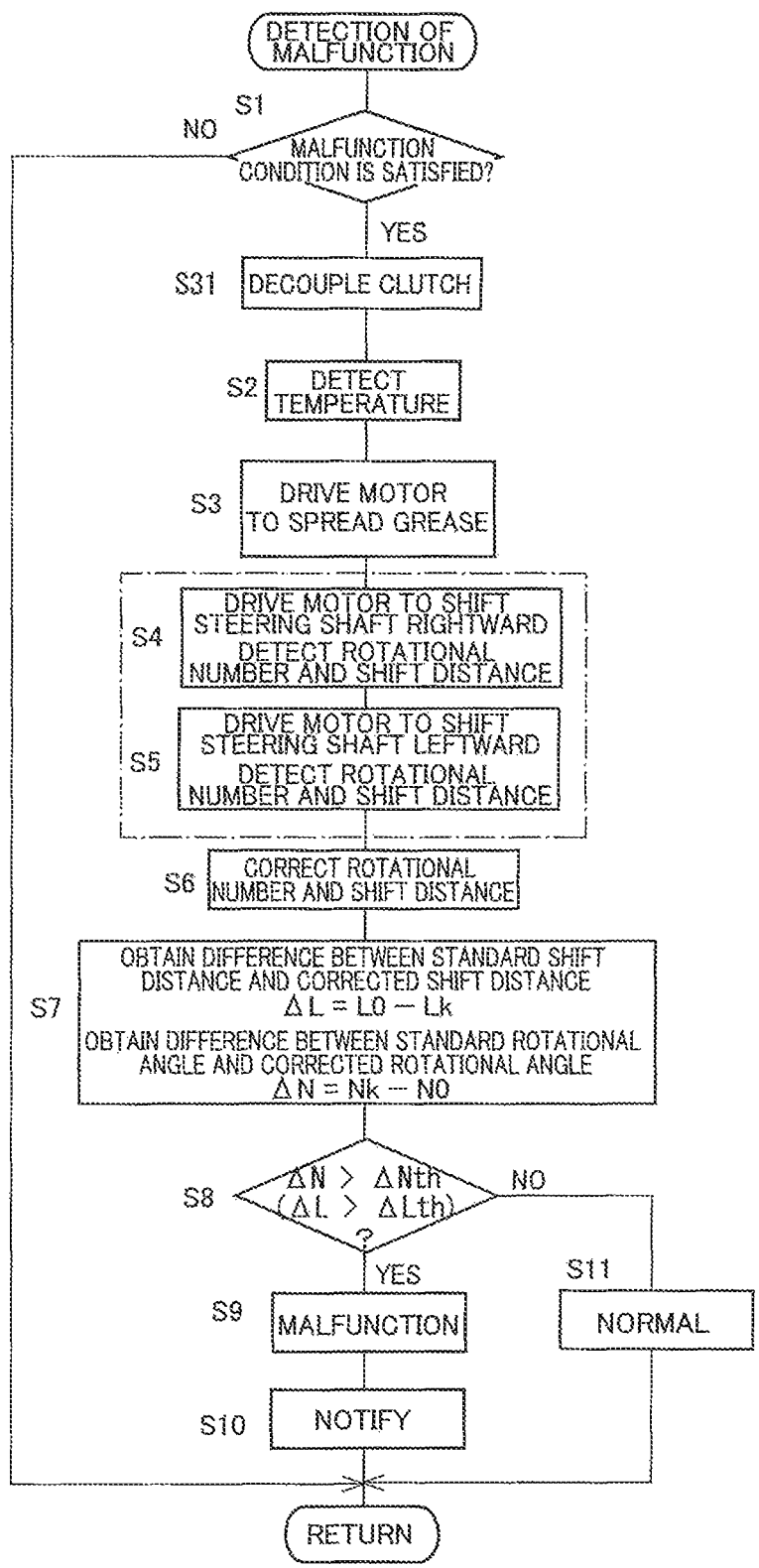
FIG. 10 is a flow chart illustrating a malfunction detecting program stored in the memory in the steering ECU of the steering system.

Upon detection of the malfunction of the transmission device 16 in this embodiment, a malfunction detecting program is executed as illustrated in the flow chart of FIG. 10. The same step number is assigned to the same execution procedure as illustrated in the flow chart of FIG. 6 without redundant explanation. In the case where the malfunction detecting condition is satisfied in the malfunction detecting program, the electromagnetic clutch 114 is decoupled in S31, and the procedures after S2 are carried out in sequence. Since the malfunction of the transmission device 16 is detected in the decoupled state of the electromagnetic clutch 114, the driver experiences less uncomfortable feeling.

Fourth Embodiment

Figure 11:
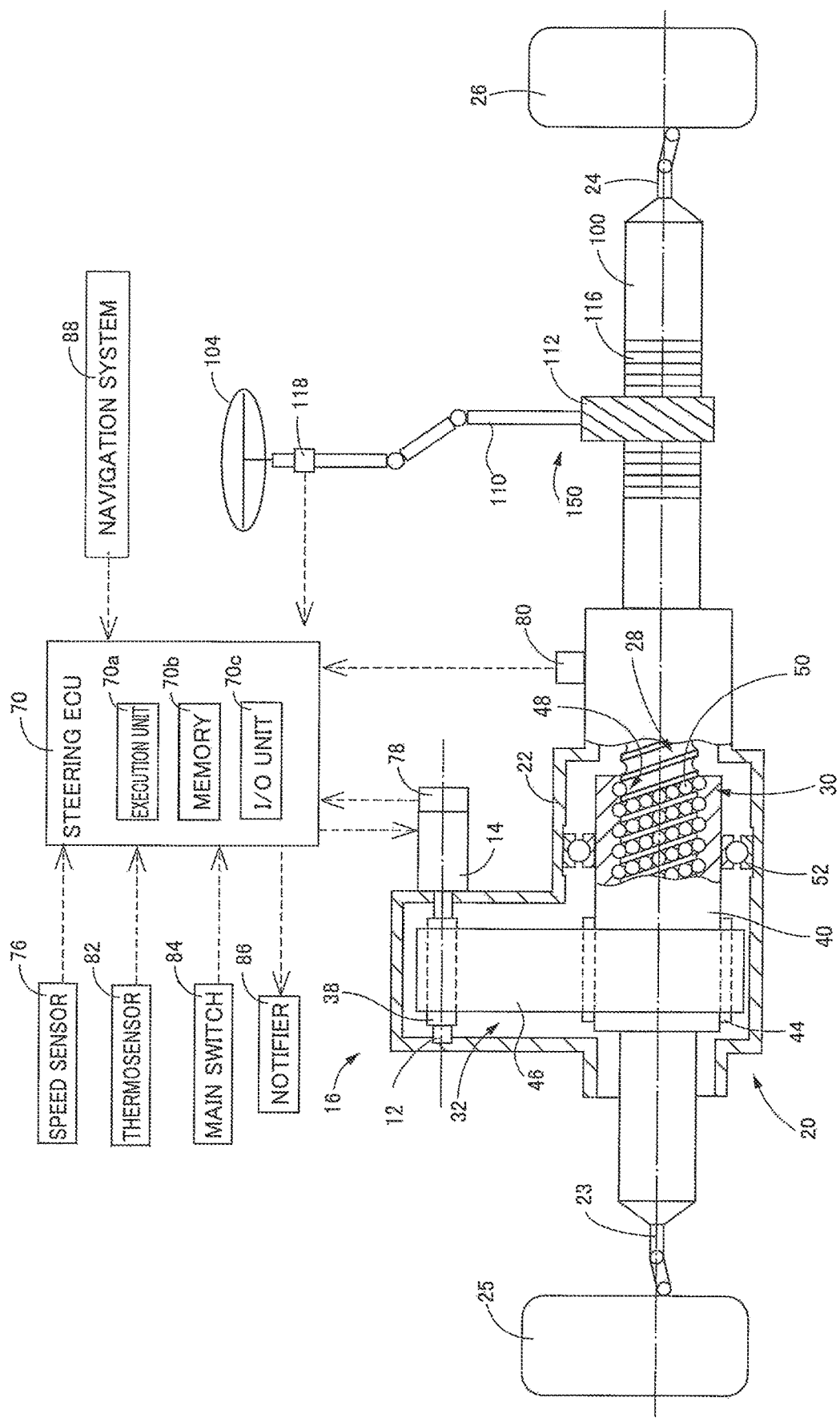
FIG. 11 is a conceptual view of a steering system according to the fourth embodiment.

The present disclosure is also applicable to a steering system illustrated in FIG. 11. The steering system according to this embodiment has a different steering transmission device from the steering system of the third embodiment. In detail, a steering transmission device 150 of the steering system according to this embodiment does not include an electromagnetic clutch. The turn of the steering wheel 104 always follows the turn of the pinion 112 and the shift of the steering shaft 100. The malfunction of the transmission device 16 is detected while the steering wheel 104 is being coupled to the pinion 112.

Persons skilled in the art could appropriately combine the first to fourth embodiments and could make various modification and improvements based on their knowledge.

Aspects of the steering system will now be described:

(1) A steering system that steers wheels of a vehicle through a shift of a steering shaft, comprising:
an electric motor;
a transmission device that transmits an output of the electric motor to the steering shaft; and
a malfunction detector that detects a malfunction of the transmission device based, on a rotational angle of the electric motor and a shift distance of the steering shaft.

(2) The steering system according to the above form (1), the transmission device comprises a motion converter that converts rotation of a steering nut to a linear motion of the steering shaft; and a rotation transmission device that transmits rotation of the electric motor to the steering nut.

(3) The steering system according to the above form (1) or (2), wherein the malfunction detector comprises:
a rotational angle obtainer that obtains the rotational angle of the electric motor; and
a shift distance obtainer that obtains the shift distance of the steering shaft;
wherein the malfunction detector is configured to determine that the transmission device is in a malfunction state when the shift distance of the steering shaft obtained by the shift distance obtainer is less than the rotational angle of the electric motor obtained by the rotational angle obtainer.

The rotational angle obtainer may include, for example, a motor tachometer and integrates the value detected from the motor tachometer to obtain the rotational angle. The shift distance obtainer may include, for example, a position sensor and determine the shift distance of the steering shaft based on the position of the steering shaft detected by the position sensor. The shift distance obtainer may include a displacement sensor that can directly detect the shift distance of the steering shaft.

(4) The steering system according to the above form (3), wherein the malfunction detector comprises a standard characteristic memory storing standard characteristics between the rotational angle of the electric motor and the shift distance of the steering shaft in a case where the transmission device is normal, and is configured to determine that the transmission device is in the malfunction state when an actual ratio of the shift distance of the steering shaft to the rotational angle of the electric motor in actual characteristics between the rotational angle of the electric motor obtained by the rotational angle obtainer and the shift distance of the steering shaft obtained by the shift distance obtainer is less than a standard ratio in the standard characteristics stored in the standard characteristic memory.

Although the standard characteristic relation is represented by multiple sets of the rotational angles of the electric motor and the shift distances of the steering shaft in many cases, it can be represented by a single set of the rotational angle of the electric motor and the shift distance of the steering shaft. Alternatively, the standard characteristic relation may be regarded as a shift distance of the steering shaft to a set rotational angle of the electric motor or as a rotational angle of the electric motor to a set shift distance of the steering shaft. Accordingly, multiple sets of the rotational angle of the electric motor and the shift distance of the steering shaft are not necessarily required in the memory.

(5) The steering system according to the above form (4),
wherein the standard characteristic memory stores a standard shift distance that indicates the shift distance of the steering shaft at a first set rotational angle of the electric motor in the case where the transmission device is normal,
wherein the malfunction detector is configured to determine that the transmission device is in the malfunction state when a difference calculated by subtracting the shift distance of the steering shaft obtained by the shift distance obtainer at the first set rotational angle of the electric motor obtained by the rotational angle obtainer from the standard shift distance stored in the standard characteristic memory is greater than a first malfunction determining threshold.

In the case of the malfunction of the transmission device, the actual shift distance of the steering shaft is smaller than the standard shift distance.

(6) The steering system according to the above form (4) or (5),
wherein the standard characteristic memory stores a standard rotational angle of the electric motor at a first set shift distance of the steering shaft in the case where the transmission, device is normal, and
wherein the malfunction detector is configured to determine that the transmission device is in the malfunction state when a difference calculated by subtracting the standard rotational angle stored in the standard characteristic memory from the rotational angle of the electric motor obtained by the rotational angle obtainer at the first set shift distance of the steering shaft obtained by the shift distance obtainer is greater than a second malfunction determining threshold.

In the case of the malfunction of the transmission device, the actual rotational angle of the electric motor is greater than the standard rotational angle. The detection of malfunction described in the form (4) and the detection of malfunction described in the form (5) may be performed at the same time to improve the reliability of the detection of the malfunction.

(7) The steering system according to any one of the above forms (3) through (8), wherein the malfunction detector comprises a shift distance corrector that corrects the shift distance of the steering shaft obtained by the shift distance obtainer based on a temperature of the transmission device.

In the case where the temperature is low than in the case where the temperature is high, the slack or play between components is larger, and accordingly the shift distance of the steering shaft with respect to the rotational angle of the electric motor is shorter. This is because the rotational angle of the electric motor not accompanying the shift of the steering shaft is larger in the case where the amount of the slack or play between components is large than in the case where the amount of the slack or play between components is small. In some embodiments, the shift distance of the steering shaft is corrected to a larger value at a low temperature and large slack or play between components than at a high temperature and small slack or play of the components. The standard characteristic relation stored in the standard characteristic memory is a standard characteristic relation in the case where the transmission device is normal and the temperature is normal temperature (at which the slack or play has a standard value).

(8) The steering system according to the above form (7), wherein the shift distance corrector is configured to add a correction value to the shift distance of the steering shaft obtained by the shift distance obtainer, and correct the correction value to a larger value when the temperature is low than when the temperature is high.

For example, in the case where the slack or play is larger when the temperature is low than when the temperature is high, the correction value may be set to a larger value when the temperature is low than when the temperature is high.

(9) The steering system according to any one of the above forms (1) through (8), wherein the malfunction detector is configured to detect the malfunction of the transmission device such that an absolute rotational angle of the electric motor does not exceed an upper limit angle.

The upper limit angle is, for example, the absolute maximum of the rotational angle of the electric motor at which the tires on the wheels can be in contact with the road surface regardless of the shift of the steering shaft. The malfunction of the transmission device may be detected within a range of the absolute shift distance of the steering shaft not exceeding the upper limit shift distance.

(10) The steering system according to any one of the above forms (1) through (9), wherein the malfunction detector is configured to determine that the malfunction detection condition is satisfied and detect the malfunction of the transmission device, under an ON state of the main switch and, a stopped state of the vehicle.

The malfunction is detected during the stopped state of the vehicle, in other words, during a state of reduced disturbance, unlike the running state of the vehicle.

(11) The steering system according to the above form (10), wherein the malfunction detector is configured to determine that the malfunction detection condition is satisfied when one of the following states is satisfied:
  A. a driver performs no steering operation;
  B. the vehicle is in a stop state for a reason other than stop signal;
  C. the vehicle stops after a steering operation for parking; and
  D. an elapsed time after the stop is within a predetermined time.

Regarding state B, the stop at the stop signal can be detected based on, for example, traffic information, navigation information, or positional information by GPS. Alternatively, the stop at the stop signal can be detected based on an image taken by a camera mounted in the vehicle. Regarding state C, the stop after steering for parking of the vehicle can be detected in the case where (a) the vehicle stops after parking assistance, (b) the vehicle stops after a steering amount exceeding a predetermined amount and several times of switching of the steering direction, or (c) the vehicle stops after going in reverse. State C is suitable for detection of malfunction because grease has spread. In some embodiments, the malfunction detector determines that the condition is satisfied when both States C and D are satisfied because the malfunction can be detected before hardening of the grease.

(12) The steering system according to any one of the above forms (3) through (11), wherein the malfunction detector is configured such that the rotational angle obtainer and the shift distance obtainer respectively obtain the rotational angle of the electric motor and the shift distance of the steering shaft in each of the rightward and leftward shifts of the steering shaft driven by the electric motor from a neutral position.

(13) The steering system according to the above form (12), wherein the malfunction detector comprises a rotational angle corrector that obtains a true neutral position by correcting the neutral position based on the rotational angle of the electric motor and the shift distance of the steering shaft in response to rightward shift of the steering shaft and the rotational angle of the electric motor and the shift distance of the steering shaft in response to leftward shift of the steering shaft, and corrects the rotational angle of the electric motor based on the true neutral position.

(14) The steering system according to any one of the above forms (1) through, (13), wherein the malfunction detector comprises a motor driving unit that drives the motor to spread the grease before the detection of the malfunction of the transmission device.

In some embodiments, the electric motor may be driven within a range substantially equal to the upper limit rotational angle, i.e., within the range of the malfunction detection of the transmission device.

(15) The steering system according to any one of the above forms (3) through (14), wherein the malfunction detector includes a motor redriving unit that re drives the electric motor when at least one of a difference between a last value and a current value in the shift distance of the steering shaft obtained by the shift distance obtainer in a case where the rotational angle of the electric motor obtained by the rotational angle obtainer is a second set rotational angle and a difference between a last value and a current value in the rotational angle of the electric motor obtained by the rotational angle obtainer in a case where the shift distance obtained by the shift distance obtainer is a second set shift distance is greater than a predetermined value, and that obtains at least one of the shift distance of the steering shaft obtained by the shift distance obtainer in the case where the rotational angle of the electric motor is the second set rotational angle and the rotational angle of the electric motor obtained by the rotational angle obtainer in a case where the shift distance of the steering is a second set shift distance.

The first set rotational angle may be the same as or different from the second set rotational angle, and the first set shift distance may be the same as or different from the second set shift distance.

(16) The steering system according to the above form (15), further comprising an obtainer-malfunction detector that determines a potential malfunction of at least one of the shift distance obtainer and the rotational angle obtainer when the difference between the last value and the current value is greater than the predetermined value after the electric motor is driven at least predetermined cycles by the motor redriving unit.

In the case where the difference between the last value and the current value is not less than the predetermined value after a predetermined cycles of driving operations of the electric motor by the motor redriving unit, the shift distance obtainer and/or the rotational angle obtainer may be abnormal and the transmission device may also be abnormal.

(17) The steering system according to any one of the above forms (1) through (16), further comprising a notifier that notifies the driver of a result of the malfunction detected at the malfunction detector.

The notifier may be a visual notifier, such as a display or a light source; an auditory notifier, such as a voice generator or a buzzer; or a tactile notifier, such as a vibrator for the steering member or slow response of the steering member.

(18) The steering system according, to any one of the above forms (1) through (17), further comprising a steering controller that controls the electric motor based on a steering state of a steering member operable by a driver.

The steering controller is primarily constituted by a computer. The steering controller and the malfunction detector may be constituted by the same computer or different computers.

(19) The steering system according to any one of the above forms (1) through (18), further comprising a steering transmission device disposed between the steering shaft and a steering member operable by the driver.

The steering shaft may be provided with a rack, and the steering transmission device may include a rack and pinion mechanism. The steering shaft or rack bar can be shifted by a steering operation of the steering member by the driver or by the driven electric motor.

(20) The steering system according to the above form (19),
wherein the steering transmission device comprising an electromagnetic clutch switchable between a coupled state in which the electromagnetic clutch couples the steering member with the steering shaft and a decoupled state in which the electromagnetic clutch decouples the steering member from the steering shaft, and
wherein the malfunction detector is configured to switch the electromagnetic clutch to the decoupled state and then detects the malfunction of the transmission device.

In the decoupled state of the electromagnetic clutch, the shift of the steering shaft is not transmitted to the steering member thy the detection of the malfunction; hence, the driver experiences less uncomfortable feeling.

(21) The steering system according to any one of the above forms (1) through (20), wherein the steering system comprises the steering member operable by the driver, but does not comprise the steering transmission device that transmits steering of the steering member to the steering shaft.

Since the system includes no steering transmission device, the steering member can be placed more freely.

What is claimed is:

1. A steering system that steers wheels of a vehicle through a shift of a steering shaft, comprising:
    an electric motor;
    a transmission device that transmits an output of the electric motor to the steering shaft; and
    a malfunction detector that detects a malfunction of the transmission device based on a rotational angle of the electric motor and a linear shift distance of the steering shaft.

2. The steering system according to claim 1, wherein the malfunction detector comprises:
    a rotational angle obtainer that obtains the rotational angle of the electric motor;
    a shift distance obtainer that obtains the linear shift distance of the steering shaft; and
    a standard characteristic memory that stores a standard characteristic relation between the rotational angle of the electric motor and the linear shift distance of the steering shaft in a case where the transmission device is normal,
    wherein the malfunction detector is configured to determine that the transmission device is in a malfunction state when a ratio of the linear shift distance of the steering shaft to the rotational angle of the electric motor in an actual characteristic relation between the rotational angle of the electric motor obtained by the rotational angle obtainer and the linear shift distance of the steering shaft obtained by the linear shift distance obtainer is less than a ratio in standard characteristics stored in the standard characteristic memory.

3. The steering system according to claim 2, wherein the standard characteristic memory stores a standard shift distance that indicates the linear shift distance of the steering shaft at a first set rotational angle of the electric motor in a case where the transmission device is normal,
wherein the malfunction detector is configured to determine that the transmission device is in the malfunction state when a difference calculated by subtracting the linear shift distance of the steering shaft obtained by the shift distance obtainer at the first set rotational angle of the electric motor obtained by the rotational angle obtainer from the standard shift distance stored in the standard characteristic memory is greater than a first malfunction determining threshold.

4. The steering system according to claim 2,
wherein the standard characteristic memory stores a standard rotational angle of the electric motor at a first set shift distance of the steering shaft in the case where the transmission device is normal, and
wherein the malfunction detector is configured to determine that the transmission device is in the malfunction state when a difference calculated by subtracting the standard rotational angle stored in the standard characteristic memory from the rotational angle of the electric motor obtained by the rotational angle obtainer at the first set shift distance of the steering shaft obtained by the shift distance obtainer is greater than a second malfunction determining threshold.

5. The steering system according to claim 2, wherein the malfunction detector comprises a shift distance corrector that corrects the linear shift distance of the steering shaft obtained by the shift distance obtainer based on a temperature of the transmission device.

6. The steering system according to claim 2, wherein the malfunction detector is configured such that the rotational angle obtainer and the shift distance obtainer respectively obtain the rotational angle of the electric motor and the linear shift distance of the steering shaft in each of the rightward and leftward shifts of the steering shaft driven by the electric motor from a neutral position.

7. The steering system according to claim 6, wherein the malfunction detector comprises a rotational angle corrector that obtains a true neutral position by correcting the neutral position based on the rotational angle of the electric motor and the linear shift distance of the steering shaft in response to rightward shift of the steering shaft and the rotational angle of the electric motor and the linear shift distance of the steering shaft in response to leftward shift of the steering shaft, and corrects the rotational angle of the electric motor based on the true neutral position.

8. The steering system according to claim 2, wherein the malfunction detector comprises a motor redriving unit that redrives the electric motor when at least one of a difference between a last value and a current value in the linear shift distance of the steering shaft obtained by the shift distance obtainer in a case where the rotational angle of the electric motor obtained by the rotational angle obtainer is a second set rotational angle and the difference between a last value and a current value in the rotational angle of the electric motor obtained by the rotational angle obtainer in a case where the shift distance obtained by the shift distance obtainer is a second set shift distance is greater than a predetermined value, and that obtains at least one of the linear shift distance of the steering shaft obtained by the shift distance obtainer in the case where the rotational angle of the electric motor is the second set rotational angle and the rotational angle of the electric motor obtained by the rotational angle obtainer in a case where the linear shift distance of the steering is a second set shift distance.

9. The steering system according to claim 8, further comprising an obtainer-malfunction detector that determines a potential malfunction of at least one of the shift distance obtainer and the rotational angle obtainer when the difference between the last value and the current value is greater than the predetermined value after the electric motor is driven by predetermined cycles by the motor redriving unit.

10. The steering system according to claim 1, wherein the malfunction detector is configured to detect the malfunction of the transmission device such that an absolute rotational angle of the electric motor does not exceed an upper limit angle.

11. The steering system according to claim 1, wherein the malfunction detector is configured to determine that the malfunction detection condition is satisfied and detect the malfunction of the transmission device, under an ON state of the main switch and a stopped state of the vehicle.

12. The steering system according to claim 1, wherein the malfunction detector comprises a motor driving unit that drives the electric motor to spread the grease before the detection of the malfunction of the transmission device.

13. The steering system according to claim 1, further comprising:
a steering member that is operable by a driver; and
a steering controller that controls the electric motor based on the steering state of the steering member.

14. The steering system according to claim 1, further comprising:
a steering member that is operable by a driver; and
a steering transmission device disposed between the steering shaft and the steering member,
wherein the steering transmission device comprises an electromagnetic clutch switchable between a coupled state in which the electromagnetic clutch couples the steering member with the steering shaft and a decoupled state in which the electromagnetic clutch decouples the steering member from the steering shaft, and
wherein the malfunction detector is configured to switch the electromagnetic clutch to the decoupled state and then detect the malfunction of the transmission device.

15. The steering system according to claim 1, wherein the steering system comprises a steering member operable by a driver, but does not comprise a steering transmission device that transmits steering of the steering member to the steering shaft.

* * * * *

UNITED STATES PATENT AND TRADEMARK OFFICE
CERTIFICATE OF CORRECTION

| | |
|---|---|
| PATENT NO. | : 10,994,773 B2 |
| APPLICATION NO. | : 16/219123 |
| DATED | : May 4, 2021 |
| INVENTOR(S) | : Shunsuke Yoshida, Koichi Ito and Ruriko Sakaguchi |

Page 1 of 1

It is certified that error appears in the above-identified patent and that said Letters Patent is hereby corrected as shown below:

On the Title Page

Item (57), Line 3, before "transmission", insert --a--.

In the Specification

Column 10, Line 7, delete "S12;" and insert --S21;--, therefor.

Column 11, Line 36, delete "steeling" and insert --steering--, therefor.

Column 13, Line 46, delete "(8)" and insert --(6)--, therefor.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*